United States Patent Office 3,147,302
Patented Sept. 1, 1964

3,147,302
SEPARATION OF GLUTAMIC ACID FROM A
FERMENTED LIQUOR
Hideo Kamata, Yoshiki Maruta, Kazuyoshi Hattori, Satoshi Ueyama, and Susumu Asano, Hofu-shi, and Iwao Matsuda and Hiroshi Kawasaki, Tokyo, Japan, assignors to Kyowa Hakko Kogyo Co., Ltd., Tokyo, Japan, a corporation of Japan
No Drawing. Filed Aug. 2, 1961, Ser. No. 128,692
Claims priority, application Japan Aug. 20, 1960
5 Claims. (Cl. 260—527)

The present invention relates to a process for separating glutamic acid from fermented liquors resulting from glutamic acid fermentations.

Fermentation liquors resulting from glutamic acid fermentations using carbohydrates as the carbon source ordinarily contain solid cells, residual saccharoid, glutamic acid, ammonium carbonate, and various other materials, such as potassium salts, sodium salts, organic acids and the like. Especially when coarse carbon sources are employed as the fermentation material, impurities are much more increased due to non-fermentative sugars, inorganic salts, organic materials, and other materials involved therein. Accordingly, it is substantially impossible to obtain easily separable crystalline glutamic acid having a higher purity, from such fermented liquors by a simple procedure, for example, by simply adjusting the pH of the liquor to about 3 by use of an acid, with a commercially settled yield.

An object of the invention is to provide a process for effectively separating glutamic acid from any kind of fermented liquors. Other objects and advantages will be apparent from the description which follows.

According to the present invention, there is provided a process for separating glutamic acid comprising a combination of steps of concentrating a fermented liquor resulting from a glutamic acid fermentation, as it is, or following removal of solid cells therefrom until the concentration of glutamic acid reaches 200–300 mg./ml., under specific conditions; adding hydrochloric acid to the concentrate; heat-treating the mixture at 130° to 150° C., thereby coagulating proteins, isolating humin materials, and, at the same time, converting pyrrolidonecarboxylic acid and glutamin to glutamic acid; filtering the solid substances off; concentrating the filtrate, if necessary; adding hydrochloric acid to the concentrate; separating isolated glutamic acid hydrochloride; and obtaining free glutamic acid from the latter.

The present inventors have made various findings as follows, after a variety of researches on the conditions in the steps.

First, we have found a notable fact that the temperature in the concentrating step has a remarkable influence to the discoloration of glutamic acid hydrochloride and to the yield of glutamic acid. The discoloration is less and the yield of glutamic acid is higher, with lowering of temperature in the concentrating step. Concretely speaking, 2000 ml. portions of a fermented liquor are concentrated to the about 1/5 volume at temperatures of 60°, 70°, 75°, 80° and 90° C., respectively. To each of the concentrates, is added almost the same volume of 20% hydrochloric acid, and the mixtures are heated at 130° to 140° C. for 2 hours, followed by filtration of solid substances. Measurements of amounts of the resulting solid substances and the nitrogen values in the above three conditions, as well as colorations of the filtrates and amounts of glutamic acid, give the following results.

| Temp. in concentration step (° C.) | Solid substance | | Coloration of filtrate | Yield of glutamic acid from glutamin and pyrrolidone-carboxylic acid in fermented liquor (percent) |
| --- | --- | --- | --- | --- |
| | Weight (percent) | N-value (percent) | | |
| 60 | 11.8 | 3.95 | Yellow ocher | 99.5 |
| 70 | 13.8 | 4.02 | do | 98.9 |
| 75 | 15.0 | 4.11 | Yellowish brown | 98.3 |
| 80 | 15.5 | 4.54 | do | 97.8 |
| 90 | 15.9 | 6.10 | Dark brown | 94.7 |

As noted from the above mentioned experimental results, a temperature in the first concentration step, of not higher than 80° C., especially of not higher than 60° C., permits the yield of less colored filtrate, less amount of solid substances after the acid-treating step, less nitrogen value in the solid substances, and much glutamic acid. The fact that a higher concentrating temperature promotes formation of unfavorable substances, increases discoloration after the hydrochloric acid-treatment and amount of impurities, and, consequently favors coloration of the product and lowers the yield, is due to the formation of a Schiff's base. A Schiff base is a primary reaction product formed from amino acids and sugars during the course of the concentration, which is converted to a secondary reaction product, from which the amino acids can not be regenerated even by use of hydrochloric acid. Accordingly, it is an essential condition for obtaining less colored glutamic acid hydrochloride having excellent quality, to conduct the first concentration at an adequate temperature, namely at a relatively lower temperature, such as below about 80° C., in the process for producing glutamic acid comprising an acid-treating step.

As for the acid-treating step, next, it has been found that an acidity of 2.0–4 normal and a temperature of 130–150° C. are the most preferable, and conditions substantially outside those are exceedingly disadvantageous from commercial points of view. Namely, as for the acid concentration, it has been found after the investigations of the degrees of conversions of pyrrolidonecarboxylic acid and glutamin to glutamic acid, as well as the amount of solid substances isolated, that not less than 2.0 normal hydrochloric acid concentration is necessary and more than 4 normal concentration causes substantially little additional effects. The acidity as identified herein means a normality concentration of a caustic soda solution needed for adjustment of the same volume of the solution, to which has been added an acid, to pH 2.0. Sulfuric acid may be employed in place of hydrochloric acid, but the former is not necessarily advantageous over the latter, since it acts as a monobasic acid. As for the temperature in the acid-treating step, the heating at about 110° C. at ordinary pressure as in the conventional methods does not permit good isolation of humin materials even after 12 hours reaction. However, the heating at above 130° C. fully permits isolation of the humin materials, so that the products which deleteriously affect to the subsequent steps of isolations of glutamic acid hydrochloride and free glutamic acid, are converted to a form easily removable within a shorter period of time. A temperature of about 150° C. is not necessary, and an unduly high temperature tends to cause the racemization and to deleteriously affect to mechanical equipment and apparatus.

The filtrate obtained by carrying out the preliminary treatment under the above mentioned conditions and, then, by filtering the solid substances produced, yields a highly pure glutamic acid in a high yield by merely adjusting the pH by use of an alkali directly. However, for obtaining further increased yield and purity, the purified filtrate, from which the solid substance has been filtered off as mentioned above, is adequately concentrated so that the concentration of glutamic acid reaches 250–350 mg./ml. Glutamic acid hydrochloride is separated after addition of concentrated hydrochloric acid or hydrogen chloride gas. Glutamic acid can be separated from the hydrochloride with excellent results.

The present invention is based upon such various findings, and is to provide a process for producing a highly pure crystalline glutamic acid from fermented liquors of glutamic acid fermentation with the cheapest prices, a higher yield and a commercially stable procedure, by carrying out each of the above mentioned steps under most preferable conditions and by combining these steps.

The invention is more fully explained with respect to the following example, which, however, is set forth merely by way of illustration and not by way of limitation.

*Example*

Three thousand milliliters of a fermented liquor containing 48 mg./ml. of glutamic acid and 2 mg./ml. of pyrrolidonecarboxylic acid is concentrated as it is, to the about ⅕ volume at a subatmospheric pressure at a temperature below 60° C. To the concentrate is added the equal volume of 20% hydrochloric acid, and the mixture is heated at 140° C. for 1 hour. After cooling the mixture, the isolated solid material therein is filtered off, and the filtrate is further concentrated to 600 ml. To the concentrate is further added 240 ml. of concentrated (36%) hydrochloric acid, and the mixture is cooled to 5° C. The isolated glutamic acid hydrochloride is separated from the solution, which is again dissolved in water, added with 1% (based upon the glutamic acid) of active carbon stirred about 30 minutes, and filtered. The pH of the filtrate is adjusted to 3.2 by addition of an alkaline solution, and the mixture is cooled to 5° C. and allowed to stand. The isolated crystals of glutamic acid are filtered and dried to yield 126.4 g. of the product (98.5% purity). The yield calculated from the starting fermented liquor is 83%.

What we claim is:

1. Process for separating glutamic acid from a fermented liquor resulting from a glutamic acid fermentation, which comprises concentrating said fermented liquor by evaporating at sub-atmospheric pressure at a temperature below 80° C. to a glutamic acid concentration of 200–300 mg./ml., acid-treating the resultant concentrate by addition of mineral acid to adjust acidity to between 2 and 4 normal, heating the acidified concentrate to a temperature of 130° to 150° C., filtering resultant solid material from the mixture, adjusting the pH of the filtrate to about 3.2 with alkali hydroxide solution, and crystallizing glutamic acid from the filtrate.

2. Process for separating glutamic acid from a fermented liquor resulting from a glutamic acid fermentation, which comprises concentrating the fermented liquor by evaporating at sub-atmospheric pressure at a temperature below 80° C. until the concentration of glutamic acid reaches 200–300 mg./ml., acid-treating the resultant concentrate by addition of mineral acid to adjust the acidity to between 2 and 4 normal, heating the concentrate to a temperature of 130° to 150° C., filtering the resultant solid material from the mixture, concentrating the resultant filtrate to a glutamic acid concentration of 250–350 mg./ml., adding concentrated hydrochloric acid to the concentrate to thereby form crystalline glutamic acid hydrochloride, and converting the resultant hydrochloride to free glutamic acid by the addition of alkali hydroxide solution.

3. Process of claim 1 wherein the mineral acid is hydrochloric acid.

4. Process of claim 1 wherein the mineral acid is sulfuric acid.

5. Process of claim 1 wherein the alkali solution is sodium hydroxide solution.

References Cited in the file of this patent

UNITED STATES PATENTS

| | | |
|---|---|---|
| 1,940,428 | Masuda | Dec. 19, 1933 |
| 1,973,574 | Marshall | Sept. 11, 1934 |